July 6, 1965 J. E. BROOK 3,193,783

MODULATOR FOR LOW MAGNITUDE VOLTAGE SIGNALS

Filed May 17, 1960

INVENTOR.
JAMES E. BROOK

United States Patent Office 3,193,783

Patented July 6, 1965

3,193,783

MODULATOR FOR LOW MAGNITUDE VOLTAGE SIGNALS

James E. Brook, Maywood, N.J., assignor to The Bendix Corporation, a corporation of Delaware Filed May 17, 1960, Ser. No. 29,714
10 Claims. (Cl. 332—52)

Figure 1:
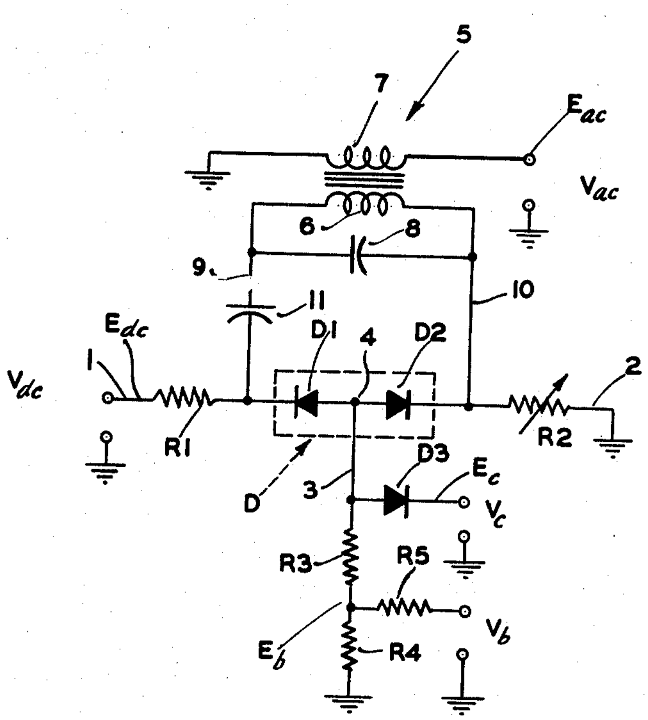

This invention relates to switch type modulators or choppers.

In circuits utilizing thermocouple signals, low magnitude direct voltage signals are encountered which are extremely difficult to handle. It is common practice to eliminate direct voltage amplifiers and modulate the direct voltage signals prior to amplification. However, present modulators including vacuum tube means or two gated diodes back to back as a shunt switch have been found unstable due to output drift over a period of time. This occurs because the electrode potentials existing between two anodes and cathodes cannot be precisely matched.

One object of the invention is to provide a modulator for low magnitude voltages and which is highly stable.

Another object of this invention is to provide a modulator for low magnitude direct voltages which is inexpensive to manufacture, resistant to shock and vibration, and provides a high degree of stability.

Another object of this invention is to provide a modulator for low magnitude direct voltages which is precisely balanced and positive in operation.

Another object is to provide a novel hybrid double diode especially adapted for use in the novel modulator constructed according to the invention.

This invention contemplates a switch type modulator having an input receiving low magnitude direct voltage signals which is connected to ground by double diode means in series opposition having precisely matched operating characteristics. A transformer is connected in parallel with the double diode means by a capacitor and provides alternating voltage output in response to the direct voltage signals. Means alternately biases the double diode means to a conducting state to provide a low impedance path from the input to ground and a nonconducting state to apply the signals to the transformer.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 2:
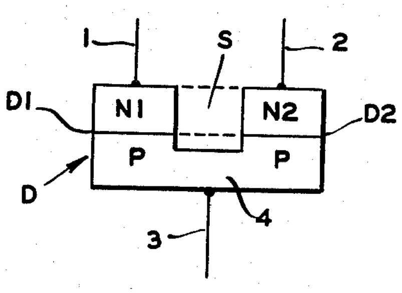

FIGURE 1 is a schematic showing of a novel modulator made according to the invention, and FIGURE 2 is a showing of a preferred form of the double diode means of FIGURE 1.

Referring now to FIGURE 1, the novel modulator includes a T-type circuit having an input arm 1, a ground or reference arm 2 and a biasing and gating arm 3 which are interconnected by a double diode D comprised of diodes D1 and D2 connected in series opposition. The input arm 1 includes a resistor R1 and a source $V_{dc}$ of low level direct voltage signals $E_{dc}$, and is connected to the diode D1. The reference arm 2 includes a resistor R2 and connects the diode D2 to a point of zero potential. The resistors R1 and/or R2 may be variable to provide equal resistance in arms 1 and 2. The biasing and gating arm 3, connected to the double diode D or diodes D1 and D2 at a common junction 4, is connected to ground by a pair of series connected resistors R3 and R4. A source $V_c$ of alternating carrier voltage $E_c$ is connected to the arm 3 and the common junction 4 by a diode D3.

A source $V_b$ of biasing voltage $E_b$ is connected to the arm 3 between the resistors R3 and R4 by a resistor R5.

An output transformer 5 has a primary winding 6 connected in parallel with a capacitor 8 across the double diode D by a line 9 with a capacitor 11 that is connected to arm 1 between the resistor R1 and the diode D1, and by a line 10 that is connected to arm 2 between the resistor R2 and the diode D2. The secondary winding 7 of the transformer 5 is connected to the modulator output $V_{ac}$.

The double diode D having matched diodes D1 and D2 in series opposition interconnecting lines 1 and 2 is shown in a preferred form in FIGURE 2. The double diode D may be made from PN type semiconductor material as a single PN junction having a slot S cut centrally completely across the N type semiconductor material to divide the material into two equal portions N1 and N2 leaving two equal PN junctions PN1 and PN2 of the same material to provide exactly common or identical operating characteristics of diodes D1 and D2. The input line 1 and the ground line 2 are connected to N1 and N2 portions, respectively, of the N type semiconductor material, and the line 3 is connected to the P type semiconductor material preferably at a point centered along the axis of the slot S and comprises the common junction 4.

With the double diode D biased to conduct by the voltage $E_b$, the input signals $E_{dc}$ applied to the line 1 from the source $V_{dc}$ are transmitted across a low impedance path including the resistors R1 and R2, and line 2 to a point of zero potential. Therefore, the primary winding 6 of the output transformer 5 is not energized. With the double diode D biased to a nonconducting state by the half wave of carrier voltage $E_c$, a pulse is applied across the primary winding 6 of the transformer 5 since its low impedance path from input $V_{dc}$ to ground is blocked. By alternately biasing the double diode D to a conducting and nonconducting state, signal voltage $E_{dc}$ is alternately applied through R1, R2 and condenser 11 to the primary winding 6 or across the double diode D to provide a pulsating or alternating voltage output signal $E_{ac}$. The transformer 5 is resonant at the carrier frequency to raise the primary impedance and to reduce the high frequency components, which causes the output wave form to approach a sine wave.

A preferred means for biasing the double diode D, comprised of diodes D1 and D2 which conduct positive voltage from junction 4, is to provide a positive biasing voltage $E_b$ from the source $V_b$ which is simultaneously applied to the diodes D1 and D2 at the common junction 4 by the arm 3. The conducting bias $E_b$ is constantly applied and is opposed at discrete intervals by the negative half wave gating signal of the alternating carrier voltage $E_c$, which is passed by diode D3 and applied to diode switch D to back bias the diodes D1 and D2 to a nonconducting state. The carrier voltage $E_c$ is of greater magnitude than the positive biasing voltage $E_b$ and may be provided in the form as an alternating voltage or negative pulses. When the carrier $E_c$ is an alternating voltage, the diode D3 only passes the negative half wave and the modulating frequency of the device is determined by the carrier frequency. When the carrier $E_c$ is a train of negative pulses, the modulating frequency is determined by the pulse frequency. By reversing the diodes D1, D2 and D3, a negative biasing voltage $E_b$ may be used and will be periodically opposed by the positive half wave of carrier voltage $E_c$ or positive pulses.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A modulator comprising a diode switch including a pair of matched diodes connected in series opposition, impedance means connected in parallel with the diode switch, an input arm including a resistor and a source of low amplitude signals connected to one of the diodes, a reference arm of equal resistance to the input arm and including a resistor connected to the other diode, and a gating arm connected between the diodes for alternately biasing the switch to a conducting state to provide a low impedance path from the input arm to the reference arm and to a nonconducting state to apply the signals to the impedance means to provide an alternating voltage output corresponding to the signals.

2. A modulator comprising a transformer, a pair of matched diodes connected in series opposition to one another and in parallel to the transformer, an input circuit including a source of low magnitude direct voltage signals and a resistor connected to one of the diodes and to a reference potential, a reference circuit of equal resistance to the input circuit including a resistor connected to the other diode and to the reference potential, and means connected between the diodes and including a source of carrier voltage for alternately biasing the diodes to a conducting state to provide a low impedance path from the input circuit to the reference circuit and to a nonconducting state to apply the signals to the transformer to provide an alternating voltage output corresponding to the signals.

3. A modulator comprising a pair of matched diodes connected in series opposition, a pair of series connected capacitors connected in parallel with the diodes, a transformer connected in series with one of the capacitors and in parallel with the other, an input circuit including a source of low magnitude direct voltage signals and a resistor connected to one of the diodes and to one of the capacitors, a reference circuit of equal resistance to the input circuit including a resistor connected to the other diode and to the other capacitor and to the transformer, and means connected between the diodes and including a source of carrier voltage for alternately biasing the diodes to a conducting state to provide a low impedance path from the input circuit to the reference circuit and to a nonconducting state to apply the signals to the transformer to provide an alternating voltage output corresponding to the signals.

4. A modulator comprising impedance means, a hybrid double diode semiconductor connected in parallel with the impedance means and having two identical PN junctions made from PN material having a single PN junction with a slot centrally completely across the N material to divide the N material into two equal portions, an input circuit including a source of low amplitude signals and a resistor connected to one portion of the N material, a reference circuit of equal resistance to the input circuit and having a resistor connected to the other portion of the N material, and means connected to the P material for alternately biasing the diode to a conducting state to provide a low impedance path from the input circuit to the reference circuit and for back-biasing the diode to a nonconducting state to apply the signals to the impedance means to provide an alternating voltage output corresponding to the signals.

5. A modulator comprising a hybrid double diode semiconductor having two identical PN junctions made from PN material having a single PN junction with a slot centrally completely across the N material to divide the N material into two equal portions, a pair of series connected capacitors connected in parallel to the diode, an input circuit including a source of low amplitude direct voltage signals and a resistor connected to one of the N portions and to one of the capacitors, a reference circuit having a resistor connected to the other N portion and to the other capacitor, one of the resistors being variable to equalize the resistance in the input arm and the reference arm, a transformer connected in series with one capacitor and in parallel with the other, and means connected to the P material and including a source of carrier voltage for alternately biasing the diode to a conducting state to provide a low impedance path from the input circuit to the reference circuit and for back-biasing the diode to a nonconducting state to apply the signals to the transformer to provide an alternating voltage output in response to the signals.

6. The modulator according to claim 1 in which the gating arm includes means for applying a constant direct voltage to bias the switch to one state, and diode means for periodically applying an alternating voltage half wave in opposition to and having greater magnitude than the direct biasing voltage to bias the switch to the other state.

7. The modulator according to claim 1 in which the gating arm includes means for applying a constant direct voltage to bias the switch to one state, and means for applying pulses at discrete intervals in opposition to and having greater magnitude than the direct biasing voltage to bias the switch to the other state.

8. The modulator according to claim 1 in which the switch is a hybrid double diode semiconductor.

9. A modulator having an input adapted to receive low magnitude direct voltage signals, a diode switch including a pair of matched diodes connected in series opposition, a load circuit connected in parallel with the diode switch, resistance means connecting the diode switch and load circuit to provide an output corresponding to the signals, the resistors and input providing parallel return paths of equal resistance for the biasing means to the input, and means for alternately biasing the switch to a conducting state to block the signals from the load circuit and to a non-conducting state to provide a high impedance path across the input for applying the signals to the load circuit.

10. A modulator having an input adapted to receive direct voltage signals, a diode switch having a matched pair of asymmetrical conducting devices connected in series opposition, a load circuit connected in parallel with the diode switch, impedance means connecting the diode switch and load circuit to the input, and biasing means connected to the switch between the asymmetrical conducting devices to alternately bias the switch to a conducting state to block the signals from the load circuit and to a non-conducting state to provide a high impedance path across the input for applying the signals to the load circuit to provide an output corresponding to the signals, the impedance means and input providing parallel return paths of equal resistance for the biasing means.

References Cited by the Examiner

UNITED STATES PATENTS

| | | | |
|---|---|---|---|
| 2,420,199 | 5/47 | Sanders | 332—52 |
| 2,748,041 | 5/56 | Leverenz | 307—88.5 X |
| 2,795,762 | 6/57 | Sziklai | 332—52 |
| 2,917,717 | 12/59 | Thorsen | 332—15 |
| 2,951,213 | 8/60 | Hecht et al. | 332—52 |
| 2,962,669 | 11/60 | Mahler | 332—52 |
| 3,005,937 | 10/61 | Wallmark et al. | 307—88.5 X |

OTHER REFERENCES

Radio Electronics, by Taylor, March 1955, pages 62–63.

ROY LAKE, *Primary Examiner.*

L. MILLER ANDRUS, ROBERT H. ROSE, *Examiners.*